United States Patent

Furman et al.

[15] 3,646,522

[45] Feb. 29, 1972

[54] GENERAL PURPOSE OPTIMIZED MICROPROGRAMMED MINI-PROCESSOR

[72] Inventors: Arthur R. Furman, Middletown; Richard Jones, Holmdel; Charles Moreland, Wall Township; Elliot Nestle, Neptune, all of N.J.

[73] Assignee: Interdata, Incorporated

[22] Filed: Aug. 15, 1969

[21] Appl. No.: 850,519

[52] U.S. Cl. ....... 340/172.5

[51] Int. Cl. ....... G06f 9/14

[58] Field of Search ....... 340/172.5

[56] References Cited

UNITED STATES PATENTS

| | | | |
|---|---|---|---|
| 3,400,371 | 9/1968 | Amdahl et al. | 340/172.5 |
| 3,518,632 | 6/1970 | Threadgold et al. | 340/172.5 |
| 3,404,378 | 10/1968 | Threadgold et al. | 340/172.5 |
| 3,475,732 | 10/1969 | Avsan et al. | 340/172.5 |
| 3,487,369 | 12/1969 | King et al. | 340/172.5 |

*Primary Examiner*—Paul J. Henon
*Assistant Examiner*—Harvey E. Springborn
*Attorney*—Maleson, Kimmelman and Ratner and Allan Ratner

[57] ABSTRACT

A processor system having a main memory to store user instructions and a read only memory which contains microroutines to emulate the user instructions. A user's instruction is fetched from the main memory and placed in an instruction register, a separate decode read only memory holds the individual starting address for the appropriate microroutine utilized in a current user instruction. The operation code of the user's instruction is applied from the instruction register to the decode read only memory for obtaining the starting address of a predetermined microroutine. Further, multiplication and division are performed according to a unique set of microroutines to significantly decrease processor operating time.

2 Claims, 6 Drawing Figures

INVENTORS.
ARTHUR R. FURMAN
RICHARD JONES
CHARLES E. MORELAND
ELLIOT NESTLE
BY
ATTORNEYS

INVENTORS.
ARTHUR R. FURMAN
RICHARD JONES
CHARLES E. MORELAND
ELLIOT NESTLE
BY Maleson, Kimmelman & Ratner
ATTORNEYS.

INVENTORS.
ARTHUR R. FURMAN
RICHARD JONES
CHARLES E. MORELAND
ELLIOT NESTLE
BY Maleson, Kimmelman & Ratner
ATTORNEYS.

INVENTORS.
ARTHUR R. FURMAN
RICHARD JONES
CHARLES E. MORELAND
ELLIOT NESTLE
BY Molinson, Kinnelman + Potner
ATTORNEYS.

INVENTORS.
ARTHUR R. FURMAN
RICHARD JONES
CHARLES E. MORELAND
ELLIOT NESTLE
BY Maleson, Kimmelman & Ratner
ATTORNEYS.

GENERAL PURPOSE OPTIMIZED MICROPROGRAMMED MINI-PROCESSOR

BACKGROUND OF THE INVENTION

1. Field of the Invention

This invention relates to the field of art of general purpose digital processors designed to perform microinstructions.

2. Prior Art

In the field of relatively small scale processors, microprograms have been used to provide a high degree of flexibility and economy. The microprogram may be used to emulate the user instruction set within reasonable bounds. By using microprogramming, the processor computation time for a set of specific operations may be significantly decreased. However, an important problem with prior microprogrammed processors has been that a general microprogram has been burdened with the need to do a lot of the housekeeping work of the processor and user instruction decoding chores. This housekeeping and instruction decoding has effectively decreased the speed of the processor for specific user's instruction sets. Therefore, it is very important to decrease the time for housekeeping and instruction decoding as much as possible.

SUMMARY OF THE INVENTION

A system for and method of performing user's instructions in accordance with microroutines stored in a read only memory. A separate decode read only memory holds individual starting addresses each related to a particular one of the user's instruction microroutines. A user's instruction is first fetched from the main memory of the processor and placed in an instruction register. The operation code of the user's instruction is applied from the instruction register to the decode read only memory for obtaining a starting address for a predetermined microroutine. The starting address is then applied to an address register which addresses the predetermined microroutine in the read only memory which will execute the user's instruction. After the user's instruction has been executed the next user's instruction is fetched from the main memory to repeat the operation. In this manner the time of housekeeping and instruction decoding is decreased substantially to a minimum value.

Further in accordance with the invention multiplication and division are performed in accordance with selected microinstructions in the read only memory having starting addresses in the decode read only memory. The selected microinstructions are recursively executed a predetermined number of times for multiplication and for division. A double register or precision shift (16-bit word length converted to a 32-bit word) is provided which is controlled by a single microinstruction in conjunction with selection logic. In addition, there is a conditional execution of an add microinstruction as a function of the last instruction or as a result of a current instruction. Specifically, in multiplication there is conditional execution of an add microinstruction depending upon whether or not a carry resulted from the double register shift. In division there is a conditional execution of an add microinstruction depending upon whether or not the add will yield a carry

The description of FIGS. 1A–4, will use the following:

DEFINITIONS

Microprogram-a collection of microinstructions stored within the read only memory which causes a specific user instruction or other functions to be executed.

Microroutine-a functional segment of a microprogram.

User instruction-an instruction by the programmer which is placed in core main memory.

Microoperations or microinstructions-hardware level instructions which are contained in read only memory and cause a specific machine operation to occur. There are 10 basic kinds of microoperations which are combined in the microprogram to cause the hardware to take those steps necessary at the hardware level to perform user instructions. These microoperations may be any one of the following: Details of the following operations are detailed in IBM Systems Reference Library, File No. 7094–01, Form A22–6703–B1, page 58–60.

| | | | |
|---|---|---|---|
| A | Add | L | Load |
| S | Subtract | C | Command |
| X | Exclusive OR | T | Test |
| N | AND | B | Branch on Condition |
| O | Inclusive OR | D | Decode |

Formats-there are four possible formats and the 10 microoperations fall into any one of four of these formats:

REGISTER TO REGISTER FORMAT

Add, Subtract, Exclusive OR,
AND, Inclusive OR, and Load

RD Register 34

| 0 3 | 4 7 | 8 11 | 12 15 |
|---|---|---|---|
| OP-CODE | D | S | E |

D = Destination field: the result of the operation is placed into the register whose address is in this field.

S = Source field: the address of the register containing the second operand is in this field. The first operand comes from the A register (AR).

E = Extended operation field: specifies options within the operation.

IMMEDIATE FORMAT

Add Immediate, Subtract Immediate,
Exclusive OR Immediate, AND Immediate,
Inclusive OR Immediate, and Load Immediate.

Register 34

| 0 3 | 4 7 | 8 16 |
|---|---|---|
| OP-CODE | D | DATA |

D = Destination field: the result of the operation is placed into the register whose address is in this field.

DATA = the second operand is in this field. The first operand comes from the A register (AR).

TEST AND COMMAND FORMAT

Register 34

| 0 3 | 4 16 |
|---|---|
| OP-CODE | TC CODE |

TC Code = Test or Command Code. Specifies the signal to be tested, or specifies the command to be performed.

BRANCH ON CONDITION FORMAT

Register 34

| 0 | 3 | 4 | 5 | 6 | 7 | 8 | 15 |
|---|---|---|---|---|---|---|---|
| OP-CODE | | C | V | G | L | ADDRESS | |

C = Carry
V = Overflow
G = Greater than zero
L = Less than zero
ADDRESS = if any specified condition (C, V, G, or L) is met, the program is transferred to the eight-bit address specified by this field.

DESCRIPTION OF THE PROCESSOR 10 HARDWARE OF FIGS. 1A–B

Figure 1A:
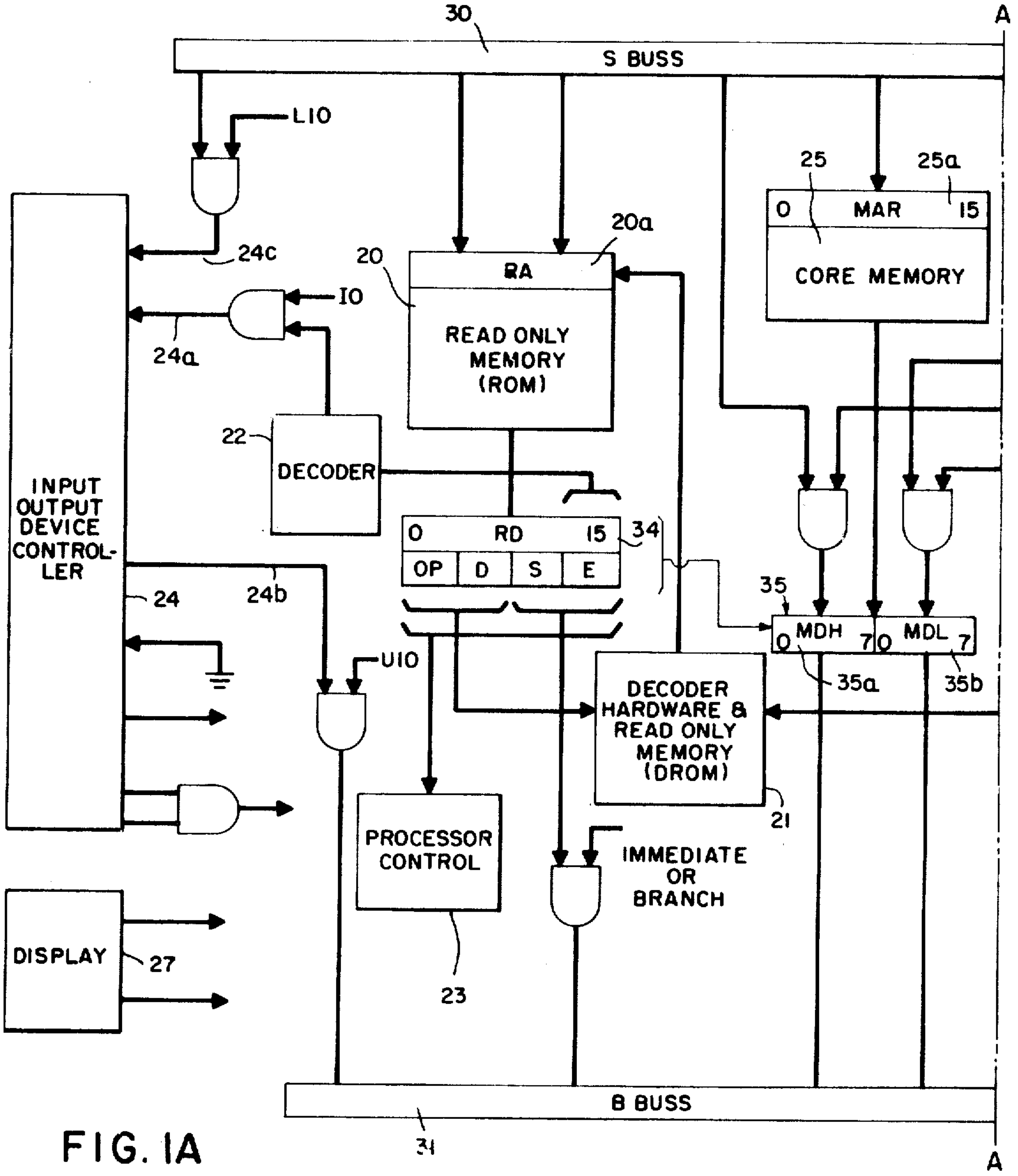
FIGS. 1A–B taken together illustrate in block diagram form a general purpose digital processor for performing microinstructions in accordance with the invention.
Figure 1B:
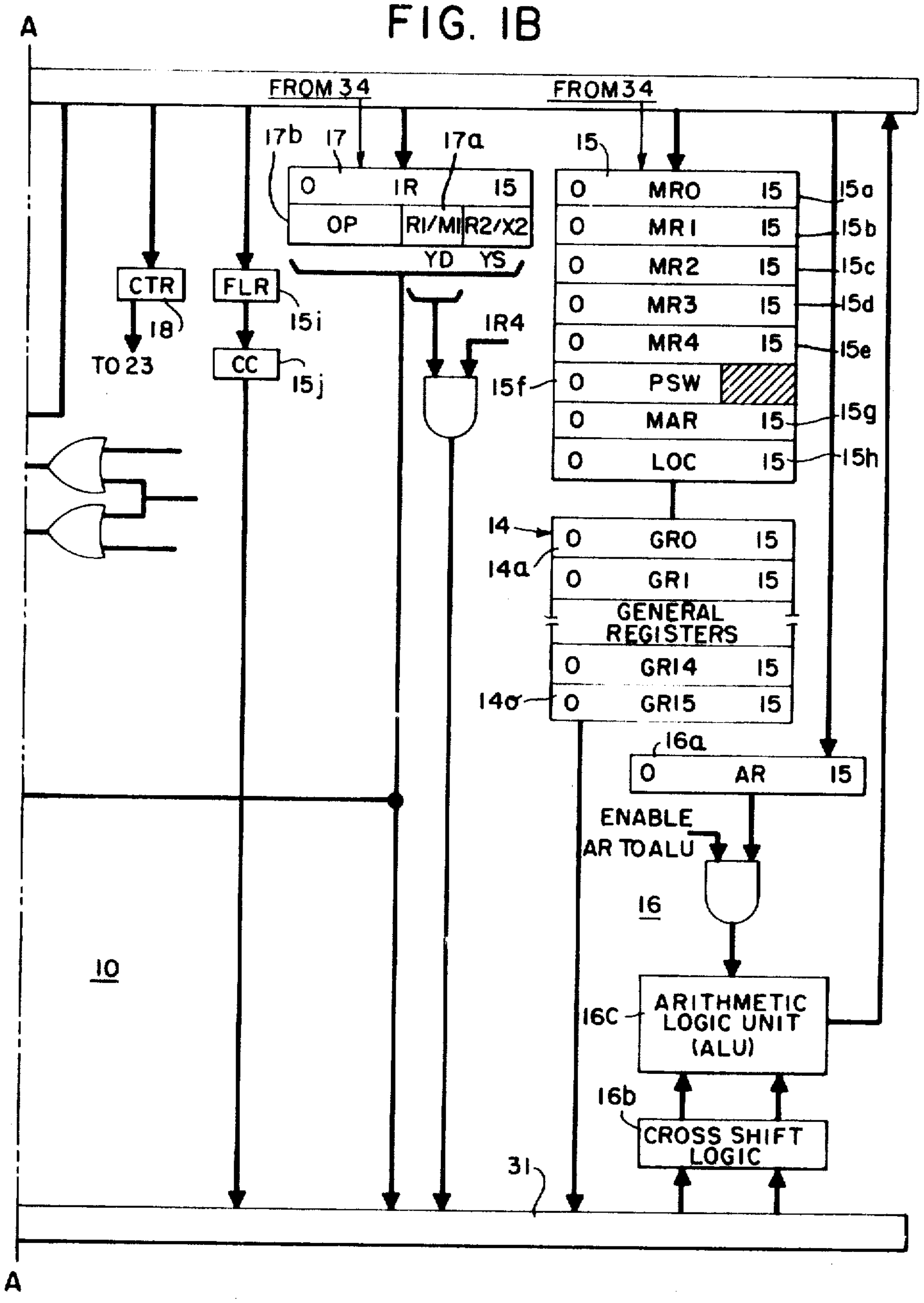

Referring now to FIGS. 1A–B there is shown a general purpose digital processor 10 designed to perform microinstructions. A set of microinstructions (the microprogram) is permanently hard wired in order that any read out can not be changed by the programmer. Combinations of subroutines perform the more complex operations that make up each of the user's instructions. There are certain functions that must be performed regardless of the user's instruction to be done. Namely that instruction must be fetched from a core memory 25, decoded and then executed. Processor 10 comprises 16, 16-bit general registers 14, an arithmetic logic unit (ALU) 16, and instruction register (IR) 17, read only memory 20, a decoder read only memory (DROM) 21, an input-output system 24, a core memory 25, a set of microregisters 15, control logic 23 and a display system 27. The foregoing main systems of processor 10 are connected between S and B busses 30 and 31 respectively by way of ALU 16.

The operation of processor 10 basically centers around ROM 20 which contains the microprogram and which directs all of the operations within processor 10. The ROM locations are addressed by a 12-register RA 20*a*. Information read from ROM 20 is placed in a 16-bit data register (RD) 34. Bits 0–3 of RD 34 specify a microoperation to be performed which in turn defines the meaning of the remaining 12 bits. The microprogram is prewired in ROM 20 by weaving wires through transformers. The microinstructions read from ROM 20 direct processor 10 by way of processor control unit 23. Unit 23, depending on the microinstruction, set up the ALU 16 to a desired mode of operation, test for specified hardware conditions, issue functional commands to establish hardware conditions, initiate memory cycles, set up microprogram loops or load and unload selected registers in the hardware register stacks 14 and 15. An explanation of a typical processor control 23 performing the functions listed herein is detailed in GE-635 Systems Manual, pages III-1 to III-10 and IV-2 to TV-7.

There are five general purpose microregisters 15*a–e* labeled MRO–MR4 each of which has a capacity of 16 bits and is directly addressable from RD 34. Registers 15*a–e* are general purpose registers and may be used for differing purposes by the microprogram. However, program status word (PSW) register 15*f* is a 16-bit register which has a specific use in processor 10. The microprogram must use register 15*f* as well as registers 15*g–h* in a specific manner. Register 15*f* indicates the system status relative to the user program being executed. Bits 0–11 of register 15*f* define machine status. Bits 12–15 are set apart in a condition code register 15*j* which may be loaded only from a flag register 15*i*. When register 15*f* is loaded, bits 12–15 of buss 30 are loaded into register 15*i* and then register 15*j*. This propogates user status from the user level to the microlevel at which the hardware operates. FLR register 15*i* and ultimately register 15*j* reflect the results of the microinstruction, or instructions in the case of a user microroutine, just performed.

The location counter (LOC) 15*h* as shown in FIG. 1B, is a 16-bit register which holds the address of the next user instruction to be performed.

A memory address register (MAR) 15*g* as shown in FIG. 1B is a 16-bit register used to address locations in core memory 25. Register 15*g* appears twice, in order to conveniently allow examination of the memory address register, once on the interface to core memory 25 and once in processor registers 15.

A memory data register 35 is a 16-bit register used to hold data read from or written into core memory 25. Register 35 is directly addressable by register 34. Register 35 is separated into two bytes (MDH) register 35*a* and MDL register 35*b* which may be loaded separately on cross shift operations.

IR register 17 is a 16-bit register used to hold the user's instruction currently being processed. Register 17 is directly addressable by register 34. In addition, provision is made for unloading only bits 8–11 of register 17 to bits 12–15 of B buss 31 for comparison between the mask (M1) 17*a* field and the register 15*i* when executing user's branches. Bits 0–7 of register 17 (the user's operation code 17*b*) are used to address locations in DROM 21. The remaining eight bits select general registers 14.

Each of the general registers 14 has a capacity of 16 bits. These user's registers (GRO–GR15) 14*a–o* are not directly addressable from register 34. In the prior description all registers have been directly addressed from register 34. However, the general register 14 selection is indirectly made. To access a particular register 14*a–o* it is necessary to address the appropriate IR 17 field which contains the address of the desired user's register 14*a–o*. To access the register specified by IR 17 bits 8–11, user's designation (YD) is addressed; to access the register specified by IR bits 12–15, user's source (YS) is addressed.

Specifically, an address is taken from register 34 and that address points the processor to YD or YS. The number that occurs at YD or YS is decoded to select a particular one of the general registers 14*a–o*. Accordingly, it is necessary that IR register 17 contain the proper address before one of the registers 14*a–o* is selected. DROM 21 may comprise up to a maximum of 128 prewired words each 12 bits long by means of a read only memory in which the cores are wired in the manner well known in the art.

DROM 21 is interrogated only on a decode microinstruction and the resulting 12-bit readout is loaded into RA register 20*a*. DROM 21 holds the starting addresses of the microroutines required to perform user's instructions. Register 20*a* may also be loaded with hardware generated addresses in the decode microinstruction.

Counter register 18 is a four-bit decrementing register. It may be preloaded with any number from 0 to 15 to count the number of repetitions of a single microinstruction or a block of microinstructions. This counter is used in the multiply or divide sequences to cause 16 iterations of the microinstruction sets as will later be described with respect to the multiply or divide operation.

Arithmetic register (AR) 16*a* is a 16-bit register used to hold the first operand in arithmetic or logical microoperations. It is one of two direct inputs to the ALU 16. The other input to ALU 16 is the 16-bit buss 31 which receives data from any one of 29 possible sources. The two eight-bit bytes of buss 31 may also be swapped by means of cross shift logic 16*b*.

ALU 16 includes a 16-bit parallel adder-subtracter logic network 16*c* with a one-bit look ahead carry. The 16-bit arithmetic or logical result from network 16*c* is gated to S buss 30 which in turn is gated to one of 33 possible designations. Details of the adder-subtractor logic network 16*c* is shown on pages 338–343 of "Pulse, Digital and Switching Waveforms" by Millman and Taub, McGraw-Hill Book Co., 1965.

Input-output transfer is accomplished by way of a single microinstruction contained in ROM 20. I/O control lines 24*a* are decoded from RD bits 14 and 15 in RD register 34. Input data is taken from data request lines (DRL 0–7) 24*b* and placed directly on buss 31 bits 8–15. Output data is taken from buss 30 bits 8-15 and loaded directly to the data available lines (DAL) 0–7 (24c).

GENERAL OPERATION OF PROCESSOR 10

Processor 10 is basically oriented toward the standard user's instruction set of Interdata Inc. Reference Manual publication No. 29–004 R01, copyright 1967. The user's instruction may cause many hardware and microprogram functions to be performed before actually entering the microroutine that will execute the instruction.

The instruction set is made up of three basic classes of instructions. The first class is defined as RR which means register-to-register, the second class is RX which means register to indexed memory and the third class is RS which is a mixture of instruction forms. The major portion of this third class comprises immediate instructions. An immediate instruction is an instruction in which the address field is treated as the data instead of the address of the data.

Figure 2:
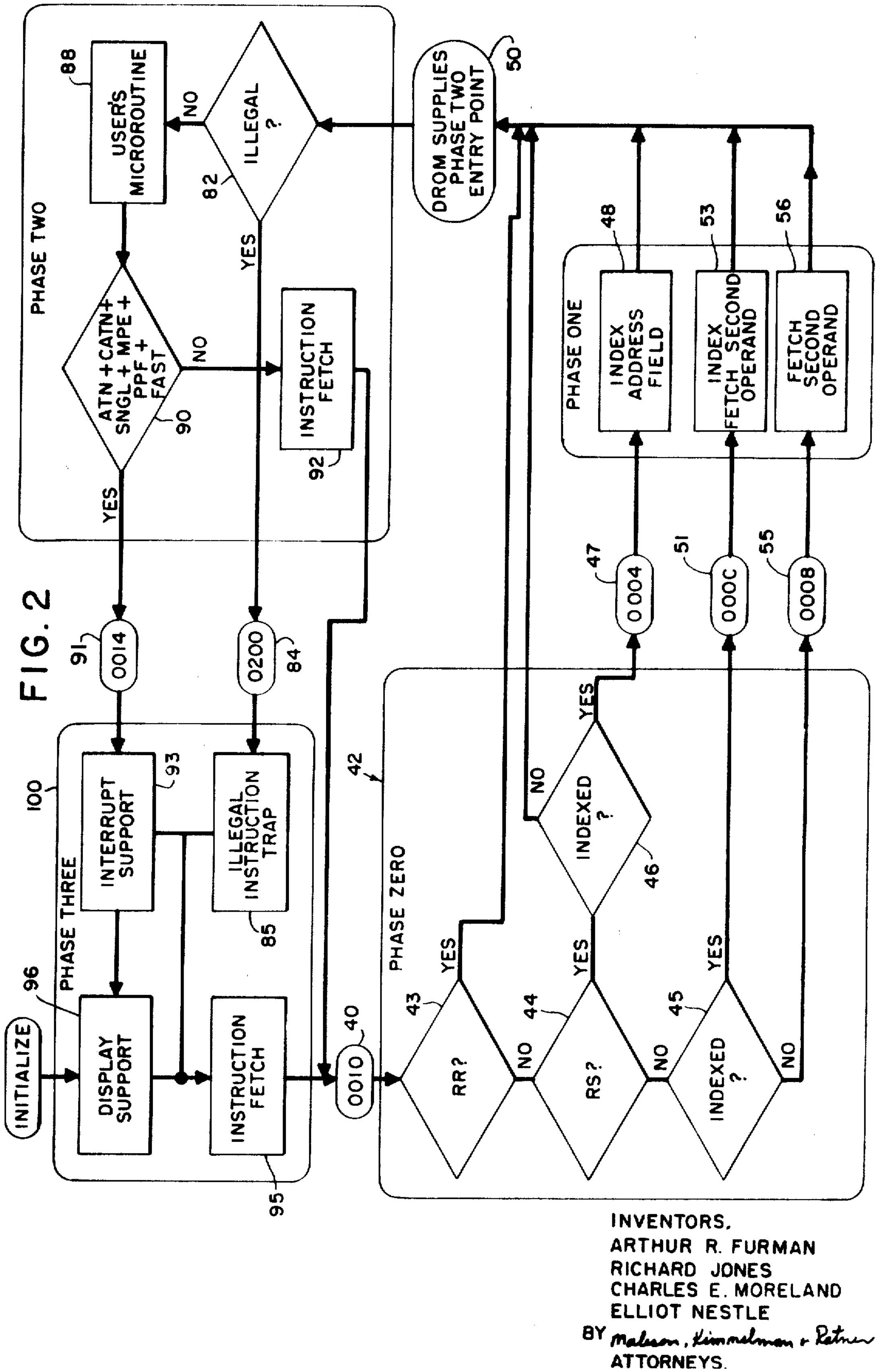
FIG. 2 illustrates a flow chart for the four phases of the processor of FIG. 1.

In processor 10 there are four hardware conditions known as "phases" as illustrated in FIG. 2. Each phase has corresponding sets of microinstructions. In general, phase zero is dedicated to users instruction fetch and class decoding. Phase one is dedicated to indexing for the second operand. Phase two is dedicated to user's instruction execution and phase three is dedicated to interrupt service and display support. These phases affect and in turn are affected only by the decode microinstruction. Upon microcode command, the appropriate next phase is entered. The phase entered is a function of the current phase and the other machine conditions.

FIG. 2 illustrates in general form a flow chart of the hardware and microprogram functions that are common to all user's instructions. A detailed computer listing of the entire basic microprogram will later be given.

A typical execution cycle of the user instruction will now be explained. User instruction execution begins when phase zero is entered.

Prior to entering phase zero a decode instruction exiting phase two or three caused core memory 25 to be read from the location specified by the location counter 15h. At the same time the location counter was incremented through control logic block 23 by two and address register 20a was forced to the starting address of the phase zero microinstruction sequence 40. The microinstructions at location 0010–0012 are used to place the OP code in the appropriate register for examination by the hardware. Specifically, the instruction register 17 controlled through block 23 is loaded from register 35 and register 25a is loaded from register 15h.

More particularly, the decode instruction exiting phase zero makes the following hardware decisions. If the instruction OP code format is RR as determined by block 43, then exit block 43 and enter phase two. If the decision is "no" , then exit block 43 and enter block 44. If the OP code is RS and is not indexed exit block 44 to block 46 and exit block 46 to phase two block 50. If the OP code is RS and has been indexed then go to phase one and to location 0004 in the microprogram to index the address field. After performing that index then exit to phase two block 50. If the OP code was not RR or RS then it must be RX so decision block 45 is entered. If indexed, then go to phase one and to address 000C in the microprogram (block 51) and index and fetch the second operand by block 53. Upon completion of this operation exit to block 50. If the OP code was RX and unindexed then go to phase one and to location 0008 in the microprogram and fetch the second operand in block 56. After that operation exit to block 50.

It will be understood that the operations performed by blocks 48, 53 and 56 are discrete instructions and can be seen at the respective addresses of blocks 47, 51 and 55 in the microprogram listing given later. The respective addresses were selected nowhere else but from the hardware by the decode instruction exiting phase zero.

A major function of digital computers is in the decoding of instructions and entry into the proper execution cycle of the processor. Usually this function has required a substantial amount of relatively expensive hardware or a time consuming logical manipulation of the OP code. In accordance with the invention an optimum cost performance ratio has been achieved by using read only memory techniques and a minimum number of logic components. In general the operation involves the fact that any time that phase two is entered either from phase zero or phase one, DROM 21 is interrogated. DROM 21 is addressed by the operation code (bits 0–7) of IR register 17. Each of the user's instructions has a unique 12-bit word that has previously been wired into DROM 21. This word is the starting address of the microroutine which will execute the specific user's instruction. The read out of DROM 21 is automatically jammed into ROM 20 address register 20a.

Figure 3:
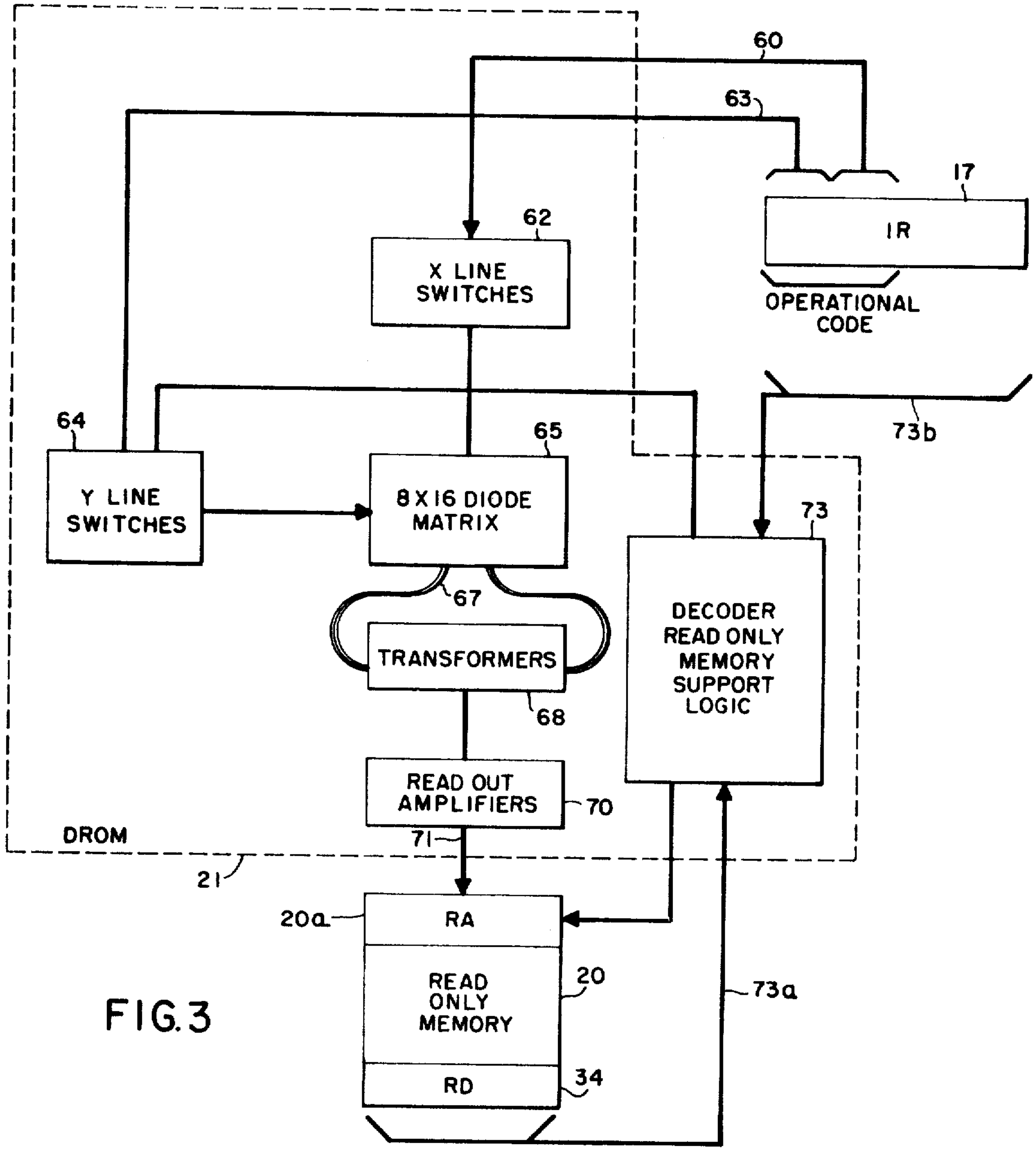
FIG. 3 illustrates in block diagram form more detail of the decode read only memory of FIG. 1.

The hardware associated with block 50, FIG. 2 is shown in more detail in FIG. 3. For logical explanation FIG. 3 will be described before completing the description through phase two and three of FIG. 2. It will be noted that some of the blocks of FIG. 3 are the same as in FIG. 1a though slightly changed in location and form for the purpose of description. The bits of the OP code from register 17 are taken by way of lines 60 to gates 62 and by way of lines 63 to gates 64. In gates 62 the OP code is used to select one of 16 X-line switches and in gates 64 the OP code is used to select one of 8 Y-line switches. Gates 62 and 64 are connected to an 8 by 16 diode matrix 65. Gate 64 provides a positive current pulse on one of the 8 Y-lines and gate 62 provides a ground return on one of the 16 X-lines. Each Y-line terminates with 16 individual diodes in the matrix. Word lines 67, connected between a Y-line terminating diode and an X-line, are threaded through an array of 12 transformers 68. In this manner one of 128 possible word lines 67 is pulsed. Each of the legal user's instructions is associated with an individual one of the word lines 67 in DROM 21. Accordingly, each of the word lines holds a starting address of a microroutine that will execute a specific user's instruction. Read only memories are well known in the art and are described in Development of an E–Core Read Only Memory, P.S. Sidhu, AFIPS Conference Proceedings, Vol. 27, Part 1, 1965 Fall Joint Computer Conference.

Word lines 67 are threaded through transformer 68 in a manner to provide a desired 12 bit starting address when a particular one of the word lines 67 is pulsed. The starting address generated by transformers 68, upon pulsing word line 67, is applied by way of 12 readout amplifiers 70, one for each of transformers 68. After being amplified, the starting address is applied by way of lines 71 to RA register 20a. In this manner, the data readout from the pulsed word line 67 is applied as an address to register 20a. Thus, in accordance with the invention, the address of the user's instruction microroutine has now been placed in register 20a that will execute the desired user's instruction placed in IR register 17.

It will now be understood in accordance with the invention the housekeeping and instruction decoding work of the processor which had previously decreased the speed of the processor for specific user's instruction sets has been substantially decreased. In addition, it is now simple and inexpensive to add additional user's instructions to the user's instruction set. Specifically, for each new instruction, a microroutine is wired into ROM 20 and the starting address of that microroutine is wired into DROM 21 by adding a word line between a terminating Y-line diode and an X-line. The word line is threaded through transformer 68 in a manner to cause the 12-bit starting address to be read out. This starting address is wired at the location whose address is the OP code of the new instruction.

Logic block 73 comprising a plurality of gates and flip-flops contains many of the logic decisions described with respect to phase zero, block 42, FIG. 2. In addition, block 73 provides the proper sequence of signals to obtain DROM readout 71 into register 20a by way of a clear line 74 followed in time by an enable signal on enable line 75.

The output buffer for ROM 20 is provided by RD register 34. Bits 0–3 are applied by way of lines 73a to logic block 73 and indicate that register 34 contains a decode instruction. In addition bits 12–15 are applied by way of line 73a to block 73 and define the extended operation field. With the foregoing information from lines 73a, block 73 also receives information from IR register 17 by way of lines 73b. Bits 0–3 of IR register 17 indicate what class of user's instruction is held in the IR. Bits 12–15 indicate whether or not the instruction has been indexed.

Now that the hardware associated with block 50 has been explained with respect to FIG. 3, the description will now return to FIG. 2 where it will be remembered that the phase two entry point 50 is derived from DROM 21. As previously described, DROM 21 may have up to 128 bit words wired into it and the words are addressed by the user's instruction of IR 17. DROM 21 has a word line for each instruction in the user's instruction set. Enabling DROM 21 causes the selected word line to be pulsed during the phase zero or phase one decode instruction. The readout provides the starting address of a phase two microroutine which is placed into RA register 20a.

Instructions not in the user's instruction set are illegal and will not have a corresponding word line in DROM 21. When phase two is entered and a nonexistent DROM word line is pulsed, the readout, all zero's is placed in register 20a. Location zero (0000) in ROM 20 is wired with all zero's (0000). When ROM address 0000 is read the contents are placed in RD register 34. All zero's in RD register 34 is defined as "illegal" and results in an unconditional phase three as shown by decision block 82. Thus, ROM address is forced to block 84 having address 0200 which is the entry point of the illegal instruction trap microroutine.

Figures 4, 4A:
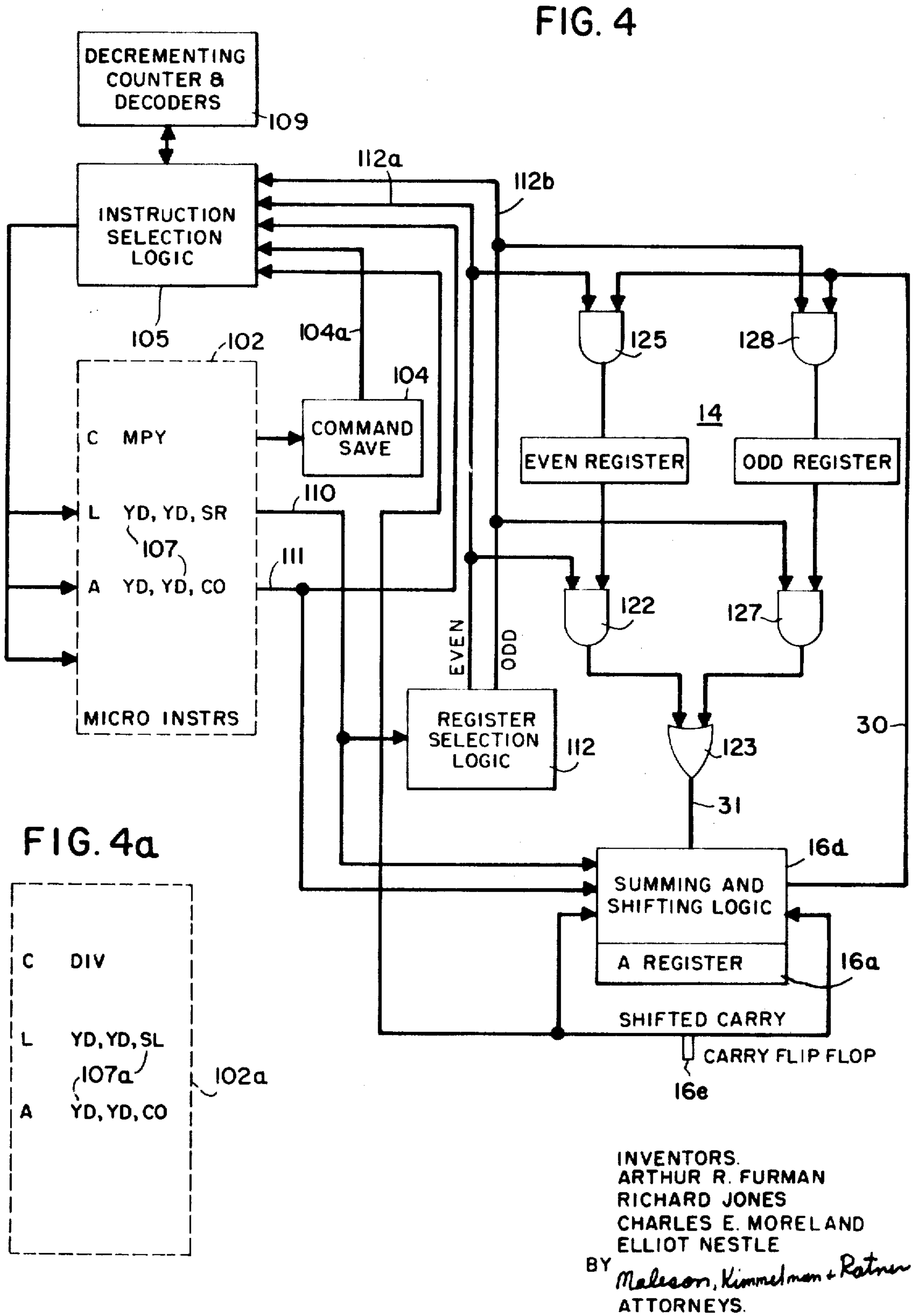
FIGS. 4 and 4A illustrate in block diagram form the structure and microinstructions in the read only memory which provide multiplication and division for the processor of FIG. 1.

If the user's instruction is not illegal then user's subroutine block 88 is entered. There may be as many blocks 88 as there are user's instructions in the user's instruction set. One of these instruction sets, which will later be described in detail with reference to FIG. 4, is multiply and divide. Thus at this time the user's instruction subroutine is performed.

Regardless of the particular subroutine performed, the functions done by the decode instructions exiting block 88 are identical. Specifically, when phase two is exited at block 90 the decode microinstruction tests for interrupts. If any interrupt is true, phase three will be entered and the ROM address register 20a is loaded with address 0014, block 91. If no interrupts are pending, block 92 is entered to fetch the next user's instruction from core 25. At the same time, phase zero is entered and the ROM address in register 20a is loaded with address 0010, block 40. In this manner, there is provided means for returning to decode and execute the next user's instruction from the main core memory 25.

In phase three, block 100, microroutine sets are dedicated to display and interrupt support. The entry points to block 100 and 0014, block 91 and 0200, block 84. Block 85 results in a program status word swap after which block 93 is entered. Block 93 services any interrupt present. After successfully servicing any interrupt, block 93 is exited and block 96 is entered which examines the status of the display panel. If no operator interrupts are pending, then enter block 95 and execute the decode instruction which fetches the next user's instruction from core memory 25 thereby to enter phase zero, block 40.

MULTIPLICATION AND DIVISION OPERATION

It will be remembered block 88 (FIG. 2) represents a complete set of user's microroutines which implement the user's instructions. Residing within the set of user's instructions there are two recursive complex microroutines necessary to implement a binary multiplication and division. In conventional processors both multiplication and division are performed by the sequential execution of shifts and/or arithmetic addition or subtraction. The decision as to whether there should be performed (1) a simple shift or (2) an arithmetic operation (addition or subtraction) and a shift, is a function of the results.

Referring now to FIG. 4 there is shown a block diagram of the circuitry and the microinstructions in ROM 20 which together provide a multiplication or division operation for processor 10. A command microinstruction in ROM 20 specifies multiplication or division and locks the processor into a counter dependent mode of operation to execute that specific multiplication or division function. In other words, upon that command microinstruction the processor cannot perform any other function until it concludes the subsequent set of microinstructions which perform the multiplication or division. In FIG. 4 the microinstructions which implement multiplication are shown in microinstruction block 102. For division block 102 in FIG. 4 is replaced by block 102a in FIG. 4A.

It is pertinent to multiplication and division instructions that when a microinstruction is strobed from ROM 20, the ROM address is incremented so that when an instruction is being executed, the address register 20a is pointing to the next sequential instruction. The least significant bit of ROM address register 20a is not involved in the decoding of the address being read. Rather in the transformer array (not shown) of ROM 20 each word line is threaded through 32 transformers. Thus each word line holds two microinstructions, not one. When the word line ROM 20 is strobed, two words at two adjacent even/odd addresses are read. For each of the transformers there is a sense amplifier (not shown). After a pair of words is read then the least significant bit of the address is used to select the set of 16 sense amplifiers whose output is unconditionally loaded into RD register 34. If the least significant bit of the address is reset, the even set of outputs is used; if set, the odd set of outputs is used.

Thus it is possible, for a given ROM address, to select the adjacent even or odd address by changing the appearance of the least significant address bit. This is one function performed by logic 105. In FIG. 4, blocks 104, 105, 109 and 112 are shown as comprising a portion of the logic circuits of blocks 18 and 23 of FIGS. 1A–B. In implementing the user's instruction, command save register 104 has the function to save the multiply or divide command for the remainder of the execution of the user's instruction. This information is available to the other hardware components illustrated in FIG. 4. For example, a command save line 104a is an input to instruction selection logic 105 and defines either multiply or divide. Logic 105 controls the sequencing of the execution of the two microinstructions 107 in block 102 for the recursive loop of multiplication. For division, logic 105 controls the sequencing of the two microinstructions 107a in block 102a in the recursive loop of division.

Instruction selection logic 105 controls the decrementing and testing of a decrementing counter and decoder assembly 109. Assembly 109 is used to control the number of recursions necessary to perform the user's instruction. For example, a count of 16 by counter assembly 109 allows for 16 recursions of microinstructions 107 for multiplication or 107a for division.

Register selection logic 112 is used to sequence an instruction between even and odd user register pair 14. This odd and even pair of registers (called pair 14) may be registers 14a–b or 14c–d etc. Logic 112 has outputs to logic 105 by way of lines 112a–b to control the recursive operation of the two microinstructions 107. Summing and shifting logic 16d (a portion of ALU 16c, FIG. 1B) is controlled by microinstructions 107 by way of control lines 110–111. Logic 16d performs either the operation of (1) addition or (2) shift of a user register 14 either even or odd. Such selection being made by register selection logic 112 over lines 112a–b. In the case of addition, AR register 16a contains the first operand and one register of the pair 14, the second operand. The sum or the shifted register contents is returned over S buss 30 from logic 16d to the even or odd user register 14 containing the second operand.

The multiply operation is initiated with a command microinstruction (C MPY) which is shown as the first microinstruction in block 102, FIG. 4. The assumed preliminary conditions are that the instruction register 17 designation field (IR register 17 bits 8–11), contains an even register address, that of even register 14 containing zeros. The next sequential user register 14 which will be an odd register contains the multiplier. The multiplicand has been placed in AR register 16a and the counter is set to 16. The multiply command is wired into an odd address, viz., address 0447 in the multiply microprogram listing, later given. The next two ROM locations are wired as shown by reference character 107 in block 102 and at locations 0448 and 0449 in the multiply microprogram listing. The clock pulse that strobes the C MPY microinstruction into RD register 34 increments register 20a to the next address which is that of the load microinstruction (L)107. The clock pulse that strobes the load instruction into register 34 increments register 20a to the next sequential address which is that of the add instruction (A)107. The same clock pulse sets command save register 104 to define the multiply mode for the remainder of the sequence and freezes the ROM address in register 20a. Accordingly, register 20a contains the address of the add microinstruction and will not increment further until the counter 18 has decremented to zero.

It will now be understood that RD register 34 contains microinstruction L YD, YD, SR 107. For this microinstruction logic 112 points by way of line 112a to the even user register 14. This register is thus unloaded through gate 122 and an OR-gate 123 onto B-buss 31 and then to logic 16d. In logic 16d, the data that was previously in even register 14 is shifted right one bit position and put on buss 30. Buss 30 is gated back to even register 14 by way of a gate 125. During the foregoing shifting process the state of the least significant bit of the bits being shifted is saved in a carry flip-flop 16e. In this manner the load instruction has been completed.

At that time the load microinstruction L 107 is again read out of block 102. (See comments under address 0448 in the multiply microprogram listing). As the load microinstruction is again executed, logic 112 switches to the odd register 14 by now selecting odd line 112b. In a manner similar to that previously described for the even register, the data from odd register 14 is applied by way of gates 127 and 123 to logic 16d. In 16d, the data is shifted right one bit position and put on buss 30. The data on buss 30 is then gated to odd register 14 by way of a gate 128. If carry flip-flop 16e had been set by the previous instruction, a one is shifted into the most significant bit of odd register 14. On the other hand if flip-flop 16e had not been set, a zero is shifted in. As in the previous description during the shift process the state of the least significant bit is saved in carry flip-flop 16e.

In the foregoing manner there is provided a 32-bit shift right by one bit in register pair 14 with the even register containing the most significant 16 bits and the odd register the least significant 16 bits. If the odd register shift produces a carry the add instruction (A)107 is strobed. On the other hand if the odd register shift instruction does not produce a carry the load instruction (L)107 is again read. The even register (A)107 pair 14 is again selected by line 112a and add instruction A or the first load instruction L is performed. If the hardware reaches the add instruction A, the multiplicand in AR register 16a is added to the product that is accumulated in the even register and the sequence returns to the first load instruction L.

Every time the first load instruction L is performed counter 109 is decremented by one. Accordingly instructions 107 are recursed until block 109 decrements to zero. In this manner there is provided an automatic loop control for a recursive execution of microinstructions 107 for the proper number of times e.g., 16, as a function of counter and decoders 109. In addition in the manner described there has been performed a conditional execution of the add microinstruction A as a result of the previous operation of the odd register of the pair 14.

In the last pass through in the recursive execution, counter 109 is decremented to zero and the ROM address in register 20a is released and allowed to increment. Register 20a increments at the conclusion of the odd shift instruction. With the counter equal to zero, the add microinstruction A will be performed regardless of the shifted carry. If the microinstruction should not have been performed there was no carry and the result is not gated to the even register 14. At the conclusion of the add microinstruction A, save register 104 is reset, the sequence is terminated and the next sequential microinstructions are performed.

The divide operation is initiated with the command microinstruction C DIV 102a, as shown at location 045d of the divide microprogram listing. The assumed preliminary conditions are that instruction register 17 designation field bits 8–11 contains an even address which is the address of even register 14 containing the most insignificant 16 bits of the dividend. The next sequential user register 14, which will be an odd register, contains the least significant 16 bits of the dividend. The divisor is negative and resides in AR register 16a. Counter 18 is set to 16. A divide command (DIV) 107a is wired into an odd address. The next two ROM 20a locations are wired to provide the two lines of microinstructions 107a.

A clock pulse strobes the divide command C DIV into register 34 increments register 20a to the next address which is that of the load instruction L, 107a. The next clock pulse strobes the load instruction into register 34 and increments register 28 to the next sequential address which is that of the add instruction A, 107a. (The two lines of microinstructions 107a are shown at locations 045E and 045F respectively of the divide microprogram computer listing, given later.) The same clock pulse sets register 104 which defines the divide mode for the remainder of the sequence and freezes the ROM address register 20a. Register 20a contains the address of the add instruction and will not increment further until counter 109 has decremented to zero.

Register 34 contains the first instruction line of microinstruction 107a but the register selection logic 112 selects the odd register 14 by way of line 112b. In this manner even though the first line of the microinstruction indicates that the even register is to be shifted, logic 112 points instead to odd register 14.

As a result of the shift left instruction (SL) of the first line of the microinstruction 107a the data from odd register 14 is shifted left one bit in logic 16d and returned to the odd register 14, in a manner similar to the shift right instruction SR in the microinstruction 107.

The next clock pulse strobes the load instruction (L) a second time and logic 112 chooses even line 112a to take the data from the even register 14, apply it to logic 16d, shift it one bit to the left and return the shifted data back to even register 14. In this manner a 32-bit shift left by one bit is performed. As in microinstruction 107 the carry from the odd register to the even register is recognized. The next clock pulse strobes the add instruction A into register 34. Logic 112 selects the data from even register 14 which is applied to logic as the subtrahend with register 16a containing the minuend. If the add instruction, which actually performs subtraction does not result in a carry, the loading of the even register is disabled and the previous partial remainder is unchanged. If the carry does result, the difference produced replaces the partial remainder in the even register 14.

It will be remembered that in the multiplication operation the add microinstruction (A) was conditionally executed while in the division operation the add microinstruction is always performed. However, in the division operation, based on the result of the addition (whether or not there is a carry), the result is conditionally returned to even register 14.

The carry produced by the addition is saved in flip-flop 16e. The sequence returns to the first load instruction (L) upon conclusion of the add instruction (A). The state of flip-flop 16e is shifted into the least significant bit of the odd register 14. This shifting takes place 16 times each time the state of carry flip-flop is shifted into odd register 14. If carry flip-flop 16e is set, the quotient is one; if reset the quotient is zero. Thus a 16-bit quotient is formed in odd register 14.

Counter 109 is decremented on every first load instruction (L) to provide the recursive execution of the microinstruction 107a the proper number of times e.g., 16. When counter 109 is decremented to zero, register 20*a* increments at the conclusion of the second load instruction (L). With the counter equal to zero the sequence does not return to the first load instruction. Command save register 104 is reset at the conclusion of the final add and the next sequential microinstructions are performed.

In this manner there is provided a rapid multiplication and division with a minimum of hardware and microprogramming space. These important advantages are achieved by the use of a double register (even and odd register 14) shift controlled by a single microinstruction (the load instruction L of 107 or 107*a*) in conjunction with the sequencing circuits of selection logic 105 and 112. A single microinstruction provides this double register shift rather than requiring one microinstruction per shift. Further, there is provided a conditional execution of an add microinstruction as a function of the last instruction or as a result of the current instruction. Specifically in multiplication there is a conditional execution of an add microinstruction depending upon whether or not a carry resulted from the double register 14 shift. On the other hand, in division there is a conditional execution of an add microinstruction depending upon whether or not the add (actually subtraction) will yield a carry. Still further there is an automatic loop control to provide recursive execution of the microinstruction a proper number of times which is a function of the decrementing counter 109.

There now follows a series of microprogram listings, some of the locations of which have previously been discussed. These microprogram listings are described in the above cited Reference Manual and Model 4 Micro-Instruction Reference Manual, Publication No. 29–32R01, Copyright 1968 for use with the Model 4 Processor of Interdata Inc., Oceanport, New Jersey

MODEL 4 MICROPROGRAM-INITIAL STATICIZING PORTION

| | | | | | |
|---|---|---|---|---|---|
| 0000 | 0000 | Initial | D | MRO,MRO | All zeroes for trap. |
| 0001 | 5002 | | L | RAH,H(intent) | Initialize. |
| 0002 | 5104 | | L | RAL,L(intent) | |
| 0003 | 0000 | | D | MRO,MRO | Filler. |
| | | * | | | |
| | | * Indexed RS entry from PO....ADRS modification P1 | | | |
| 0004 | 48E3 | AMODRS | L | AR,YS | Index to AR. |
| 0005 | CAA7 | | A | MDR,MDR | Second OP sum. |
| 0006 | 0663 | | D | LOC,LOC,PC+CLR | RS decode NO MR. |
| 0007 | 0000 | | D | MRO,MRO | Filler. |
| | * | | | | |
| | | * No index RX entry from PO....no ADRS MOD P1 | | | |
| 0008 | 45A3 | NMODRX | L | MAR,MDR | Adrs to MAR. |
| 0009 | 066B | | D | LOC,LOC,P1 | Fetch, Decode. |
| 000A | 0000 | | D | MRO,MRO | Filler. |
| 000B | 0000 | | D | MRO,MRO | Filler. |
| | | * | | | |
| | | * Indexed RX entry from PO....ADRS modification P1 | | | |
| 0000 | 48E3 | AMODRX | L | AR,YS | Index to AR. |
| 000D | C5A7 | | A | MAR,MDR | Sum to MAR. |
| 000E | 066B | | D | LOC,LOC,P1 | Fetch,decode. |
| 000F | 0000 | | D | MRO,MRO | Filler. |
| | | * | | | |
| | | * Instruction class decoded in phase 0 | | | |
| 0010 | 49A3 | Phase O | L | IR,MDR | Transfer INS to IR. |
| 0011 | 4563 | | L | MAR,LOC | ADRS portion of INST to MAR. |
| 0012 | 08EB | | D | AR,YD,PO | Fetch,decode, Inc?, XFER? |
| | | * Enter help from idle | | | |

The foregoing microprogram listing will be described with respect to specific locations which are contained in the first column of the listing:

0000–0003 provides an initializing link so that on power up a special microroutine may be executed.

0004–0007 represents a phase one microroutine in which the address field is added to the contents of the specified register 14 to form the effective operand.

0008–000B represents a phase one microroutine for fetching a second operand from core memory 25 when no indexing is called for.

000C–000F represents a phase one microroutine for fetching a second operand by adding the contents of a register 14 to the address field of the user's instruction to form the effective address of the second operand.

0010–0012 represents the phase zero microroutine in which the instruction is placed in instruction register 17 and decoded and control then is passed to phase one or phase two.

MULTIPLY FIXED POINT MICROPROGRAM LISTING

| | | | | | |
|---|---|---|---|---|---|
| 043A | 4AE3 | RR mult | L | MDR, YS | Fetch RR multiplicand |
| 043B | 5004 | RX mult | L | RAH, H (RX mult) | Set page |
| 043C | 68AC | | O | AR, MDR, NA+NC | Test multiplicand neg |
| 043D | 1240 | | B | G, NOCMP | If pos do not compliment |
| 043E | E8AC | | S | AR, MDR, NA+NC | 2's compliment of multiplicand |
| 043F | 3020 | | C | SUT | Set U flop, denote neg can |
| 0440 | 6FFF | NOCMP | O | YDPI, YDPI, NA | Test if multiplier neg |
| 0441 | 1244 | | B | G, STMM | If pos do not compliment |
| 0442 | EFFC | | S | YDP1, YDP1, NA+NC | 2's compliment of multiplier |
| 0443 | 3030 | | C | TUT | Trigger U flop for sign prod |
| 0444 | 5B00 | STMM | L | FLR, X' 0' | Clear flag reg |
| 0445 | 5C00 | | L | CNTR, X' 0' | Clear cntr reg for count of |
| 0446 | 5E00 | | L | YD, X' 0' | Clear MSH of product |
| 0447 | 3400 | | C | MPY | Multiply mode |
| 0448 | 4EE7 | | L | YD, YD, SR | Shift plier right |
| | | * L YDP1, YDP1, SR Hidden instruction, implied by MPY MOD | | | |
| 0449 | CEE5 | | A | YD, YD, CO | Add CAND to partial product |
| 044A | 4EE5 | | L | YD, YD, SR+CO | Correct product by shifting |
| 044B | 4FF6 | | L | YDP1, YDP1, CI+SR | right once |
| 044C | 2040 | | T | UT | Test if product should be NE |
| 044D | 1150 | | B | L, OKMPY | |
| 044E | EFFD | | S | YDP1, YDP1, NA+CO | 2's compliment of double |
| 044F | EEEE | | S | YD, YD, NA+CI | Length product |
| 0450 | 4563 | OKMPY | L | MAR, LOC | Normal exit |
| 0451 | 066B | | D | LOC, LOC, P2N | |

043A–0446 initializing the microroutine for multiplication in which the operands are made positive if necessary and the sign of the result is determined.

0447–0449 these locations were previously described.

044A–0451 the microroutine apends the proper sign to

DIVIDE FIXED POINT MICROPROGRAM LISTING

| | | | | | |
|---|---|---|---|---|---|
| 0452 | 4AE3 | DIVRR | L | MDR, YS | Load divisor. |
| 0453 | 5004 | DIVRX | L | RAH, H(DIVRX) | Set page. |
| 0454 | 43F3 | | L | MR3, YDP1 | Save LSH dend. |
| 0455 | 64EC | | O | MR4, YD, NC+NA | Check sign of dend. |
| 0456 | 1175 | | B | L, COMPD | |
| 0457 | 68AF | OKDIV | O | AR, MDR, NA | Test sign of divisor. |
| 0458 | 1273 | | B | G, COMSOR | Divisor will be made neg. |
| 0459 | 3030 | | C | TUT | Trigger U flop if neg for SI |
| 045A | C5E5 | BCKDIV | A | MAR, YD, CO | Develop 2 ** 16 quot which is |
| 045B | 186F | | B | C, OVDIV | |
| 045C | 5C00 | | L | CNTR, X' 0' | Count of 16. |
| 045D | 3800 | | C | DIV | Divide mode. |
| | | * L YDPI, YDPI, SL SHIFT QUOTIENT, FORCED INSTRUCTION | | | |
| 045E | 4EEB | | L | YD, YD, SL | Shift partial, remainder. |
| 045F | CEE5 | | A | YD, YD, CO | Gate sum to YD if C from PRE. |
| 0460 | 4FFB | End | L | YDP1, YDP1, SL | Instruction, final quot shift. |
| 0461 | 6FFC | | O | YDP1, YDP1, NA+NC | Test sign of quot. |
| 0462 | 116B | | B | L, STEST | If neg may be OV. |
| 0463 | 2040 | | T | UT | UT set if quot neg. |
| 0464 | 1166 | | B | L, BCKCP | |
| 0465 | EFFC | | S | YDP1, YDP1, NA+NC | 2's comp of quot. |
| 0466 | 644C | BCKCP | O | MR4, MR4, NA+NC | Check sign of dend, remainder. |
| 0467 | 1269 | | B | G, EXDIV | Carrys sign of dend. |
| 0468 | EEEC | | S | YD, YD, NA+NC | 2's compliment of remainder. |
| 0469 | 4563 | EXDIV | L | MAR, LOC | |
| 046A | 066B | | D | LOC, LOC, P2N | Normal exit. |
| 046B | 2040 | Stest | T | UT | Should quot be neg. |
| 046C | 116F | | B | L, OVDIV | If not then OV occured. |
| 046D | EFFC | | S | YDP1, YDP1, NA+NC | Comp quot —215 corrans. |
| 046E | 1166 | | B | L, BCKCP | |
| 046F | 4F33 | OVDIV | L | YDP1, MR3 | Restore dividend. |
| 0470 | 4E43 | | L | YD, MR4 | |
| 0471 | 5002 | | L | RAH, H(DIVPSW) | |
| 0472 | 51D3 | | L | RAL, L(DIVPSW) | |
| 0473 | E8AC | Comsor | S | AR, MDR, NA+NC | COMPLIMENT DIVISOR. |
| 0474 | 515A | | L | RAL, L(BCKDIV) | |
| 0475 | EFFD | Compd | S | YDP1, YDP1, NA+CO | 2's comp LSH dend. |
| 0476 | EEEE | | S | YD, YD, NA+CI | 2's comp MSH dend. |
| 0477 | 3020 | | C | SUT | Set UT to denote neg dend. |
| 0478 | 5157 | | L | RAL, L(OKDIV) | |

the product, the product is rescaled and the next user's instruction is fetched.

0452–045C initializing the microroutine in which the dividend is made positive if necessary and in which the divisor is made negative if necessary. The sign of the quotient and the remainder is established and a possible overflow condition is sensed.

045D–045F These locations were previously described.

0460–046A the microroutine in which the quotient and the remainder are properly scaled, correct signs plus or minus are appended and further check for overflow is sensed.

046B–0478 collection of microroutines which are used to complement the operands and operations.

ADDRESSES OF THE MICROROUTINES IN DROM 21

| | | | | |
|---|---|---|---|---|
| 0000 | 0000 | Z | X'000' | |
| 0001 | 0010 | Z | X'010' | BALR. |
| 0002 | 0020 | Z | X'020' | BTCR. |
| 0003 | 0026 | Z | X'026' | BFCR. |
| 0004 | 002C | Z | X'020' | NHR. |
| 0005 | 003E | Z | X'03E' | CLHR. |
| 0006 | 0032 | Z | X'032' | OHR. |
| 0007 | 0038 | Z | X'038' | XHR. |
| 0008 | 004A | Z | X'04A' | LHR. |
| 0009 | 0000 | Z | X'000' | CHR trap. |
| 000A | 0044 | Z | X'044' | AHR. |
| 000B | 004F | Z | X'04F' | SHR. |
| | | ORG | X'00E' | SKIP HSO. |
| 000E | 0055 | Z | X'055' | ACHR. |
| 000F | 005D | Z | X'05D' | SCHR. |
| | | ORG | X'040' | |
| 0040 | 0018 | Z | X'018 | STH. |
| 0041 | 001D | Z | X'01D | BAL. |
| 0042 | 0021 | Z | X'021' | BTC. |
| 0043 | 0027 | Z | X'027' | BFC. |
| 0044 | 002E | Z | X'02E' | NH. |
| 0045 | 0040 | Z | X'040' | CLH. |
| 0046 | 0034 | Z | X'034' | OH. |
| 0047 | 003A | Z | X'03A | XH. |
| 0048 | 0040 | Z | X'040' | LH. |
| 0049 | 0000 | Z | X'000' | CH trap. |
| 004A | 0046 | Z | X'046' | AH. |
| 004B | 0051 | Z | X'051' | SH. |
| | | ORG | X'04E' | |
| 004E | 0058 | Z | X'058 | ACH. |
| 004F | 0060 | Z | X'060' | SCH. |
| | | ORG | X'090' | |
| 0090 | 00F8 | Z | X'0F8 | Unch. |
| 0091 | 0000 | Z | X'000' | |
| 0092 | 008B | Z | X'08B' | STRB. |
| 0093 | 0083 | Z | X'083' | LBR. |
| | | ORG | X'09A' | |
| 009A | 00BE | Z | X'0BE' | WDR. |
| 009B | 00AB | Z | X'0AB' | RDR. |
| | | ORG | X'09D | |
| 009D | 0007 | Z | X'0C7' | SSR. |
| 009E | 00B5 | Z | X'0B5' | OCR. |
| 009F | 00D5 | Z | X'0D5' | AIR. |
| | | ORG | X'0C0' | |
| 00C0 | 0095 | Z | X'095 | BXH. |
| 00C1 | 0095 | Z | X'095' | BXLE. |
| 00C2 | 02DA | Z | X'2DA' | LPSW. |
| 00C3 | 0000 | Z | X'000' | LPSD trap. |
| 00C4 | 002E | Z | X'02E' | NHI. |
| 00C5 | 0040 | Z | X'040' | CLHI. |
| 00C6 | 0034 | Z | X'034' | OHI. |
| 00C7 | 003A | Z | X'03A' | XHI. |
| 00C8 | 004C | Z | X'04C' | LHI. |
| 00C9 | 0000 | Z | X'000' | CHI trap. |
| 00CA | 0046 | Z | X'046' | AHI. |
| 00CB | 0051 | Z | X''051 | SHI. |
| 00CC | 0074 | Z | X'074' | SRHL. |
| 00CD | 006E | Z | X'06E' | SLHL. |
| 00CE | 0065 | Z | X'065' | SRHA. |
| 00CF | 007A | Z | X'07A' | SLHA. |
| 00D0 | 0249 | Z | X'249' | STM. |
| 00D1 | 0214 | Z | X'214' | LM. |
| 00D2 | 0091 | Z | X'091' | STB. |
| 00D3 | 0087 | Z | X'087' | LB. |
| | | ORG | X'0D5' | |
| 00D5 | 02DF | Z | X'2DF' | AL. |
| | | ORG | X'0DA | |
| 00DA | 00C3 | Z | X'0C3' | WD. |
| 00DB | 00B0 | Z | X'0B0' | RD. |
| | | ORG | X'0DD' | |
| 00DD | 00CF | Z | X'0CF' | SS. |
| 00DE | 00BA | Z | X'0BA' | OC. |
| 00DF | 00DC | Z | X'0DC' | AI. |

0000–00DF represents the addresses of the microroutines which perform the user's instructions.

What is claimed is:

1. A method for performing user's instructions which are stored in a main memory of a processor in accordance with microroutines built into a first read only memory and starting addresses built into a second, read only memory, comprising the steps of fetching a user's instruction from said main memory;

initiating a phase placing said user's instruction in an instruction register;

applying the operation code of said user's instruction from said instruction register to said second read only memory for obtaining a starting address for a predetermined microroutine from the first read only memory each individual starting address wired into the second read only memory addressing its own particular one of said built in microroutines;

accessing by the obtained starting address the particular microroutine in the first read only memory which will execute the fetched user's instruction; and causing said processor to process the accessed microroutine in compliance with said user's instructions.

2. The method of claim 1 in which there is provided the further step of fetching the next user's instruction from the main memory after the present user's instruction has been executed.

* * * * *